US009786872B2

(12) United States Patent
Suh et al.

(10) Patent No.: US 9,786,872 B2
(45) Date of Patent: Oct. 10, 2017

(54) FLEXIBLE SECONDARY BATTERY

(71) Applicant: SAMSUNG SDI CO., LTD., Yongin-si, Gyeonggi-do (KR)

(72) Inventors: Junwon Suh, Yongin-si (KR); Jeong-Doo Yi, Yongin-si (KR); Juhee Sohn, Yongin-si (KR); Hyunhwa Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 9 days.

(21) Appl. No.: 14/705,853

(22) Filed: May 6, 2015

(65) Prior Publication Data

US 2016/0013459 A1 Jan. 14, 2016

(30) Foreign Application Priority Data

Jul. 14, 2014 (KR) .................. 10-2014-0088450

(51) Int. Cl.
*H01M 2/02* (2006.01)
*H01M 2/04* (2006.01)
*H01M 4/66* (2006.01)
*H01M 2/06* (2006.01)

(52) U.S. Cl.
CPC ....... *H01M 2/0202* (2013.01); *H01M 2/0212* (2013.01); *H01M 2/0275* (2013.01); *H01M 2/0404* (2013.01); *H01M 2/0482* (2013.01); *H01M 2/06* (2013.01); *H01M 4/661* (2013.01); *H01M 2220/30* (2013.01)

(58) Field of Classification Search
CPC .................................................... H01M 2/02
See application file for complete search history.

(56) References Cited

U.S. PATENT DOCUMENTS

| 6,743,546 B1* | 6/2004 | Kaneda | H01M 2/021 429/127 |
| 8,492,022 B2* | 7/2013 | Kim | H01M 2/0202 429/130 |
| 2011/0287301 A1* | 11/2011 | Kim | H01M 2/18 429/160 |

(Continued)

FOREIGN PATENT DOCUMENTS

EP   2 528 133 A1   11/2012
JP   07-006771      1/1995

(Continued)

OTHER PUBLICATIONS

English Machine Translation of Japanese Publication No. 11-054096, dated Feb. 26, 1999, for JP 3777584 B2, 10 pages.

(Continued)

*Primary Examiner* — Alex Usyatinsky
(74) *Attorney, Agent, or Firm* — Lewis Roca Rothgerber Christie LLP

(57) ABSTRACT

A flexible secondary battery includes: an electrode assembly including a first electrode layer, a second electrode layer, and a separator between the first electrode layer and the second electrode layer; a gasket having flexibility and surrounding edges of the electrode assembly; a first sealing sheet attached to a first surface of the gasket; and a second sealing sheet attached to a second surface of the gasket facing away from the first surface, wherein an uneven pattern is at a bendable area of the gasket.

11 Claims, 6 Drawing Sheets

(56) References Cited

U.S. PATENT DOCUMENTS

| | | | |
|---|---|---|---|
| 2011/0300437 A1* | 12/2011 | Yi | H01M 2/0212 |
| | | | 429/179 |
| 2012/0034513 A1* | 2/2012 | Kim | H01M 2/0275 |
| | | | 429/186 |
| 2013/0101884 A1 | 4/2013 | Ueda | |
| 2013/0344380 A1* | 12/2013 | Lee | H01M 2/02 |
| | | | 429/186 |

FOREIGN PATENT DOCUMENTS

| | | |
|---|---|---|
| JP | 2000-173559 | 6/2000 |
| JP | 3777584 B2 | 5/2006 |
| JP | 2013-093215 A | 5/2013 |
| KR | 1998-014139 U | 6/1998 |
| KR | 10-1163392 B1 | 7/2012 |

OTHER PUBLICATIONS

English Machine Translation of Japanese Publication No. 2013-093215, dated May 16, 2013, 24 pages.
Korean Patent Abstracts Publication No. KR 10-2011-0044954 A, dated May 3, 2011, for KR 10-1163392 B1, 1 page.
EPO Search Report dated Nov. 17, 2015, for corresponding European Patent application 15176211.9, (7 pages).
English machine translation of Japanese Publication 7-6771 dated Jan. 10, 1995, (7 pages).
English machine translation of Japanese Publication 2000-173559 dated Jun. 23, 2000, (33 pages).

* cited by examiner

FLEXIBLE SECONDARY BATTERY

CROSS-REFERENCE TO RELATED APPLICATION

This application claims priority to and the benefit of Korean Patent Application No. 10-2014-0088450, filed on Jul. 14, 2014, in the Korean Intellectual Property Office, the entire content of which is incorporated herein by reference.

BACKGROUND

1. Field

One or more embodiments of the present invention relate to a flexible secondary battery.

2. Description of the Related Art

As electronic technology has developed, the market for various mobile electronic devices such as smart phones, smart pads, e-book readers, flexible tablet computers, or wearable medical devices as well as mobile phones, game players, portable multimedia players (PMPs), or MPEG audio layer-3 (MP3) players has greatly grown.

As the market for mobile electronic devices has grown, the demand for batteries suitable for the mobile electronic devices has also increased. As the demand for flexible mobile electronic devices with improved utility, mobility, storage, and impact resistance has increased, the demand for flexible batteries to be used in the flexible mobile electronic devices has also increased.

SUMMARY

One or more embodiments of the present invention are directed toward a flexible secondary battery, which may maintain stability even after the flexible secondary battery is repeatedly bent.

Additional aspects of embodiments will be set forth in part in the description which follows and, in part, will be apparent from the description, or may be learned by practice of the presented embodiments.

According to one or more embodiments of the present invention, a flexible secondary battery includes: an electrode assembly including a first electrode layer, a second electrode layer, and a separator between the first electrode layer and the second electrode layer; a gasket having flexibility and surrounding edges of the electrode assembly; a first sealing sheet attached to a first surface of the gasket; and a second sealing sheet attached to a second surface of the gasket facing away from the first surface, wherein an uneven pattern is at a bendable area of the gasket.

The uneven pattern may be at at least one selected from the first surface, the second surface, and one pair of side surfaces of the gasket that couple the first surface and the second surface.

At least one selected from a thickness and a width of the gasket may vary at the bendable area along a longitudinal direction of the electrode assembly.

The gasket may have an average thickness of about 80% to about 120% of a thickness of the electrode assembly.

The uneven pattern may be formed to be denser at a central portion of the bendable area than at an outer portion of the bendable area.

The uneven pattern may have a wave shape.

Each of the first sealing sheet and the second sealing sheet may include a first insulating layer, a metal layer, and a second insulating layer, wherein the first insulating layer contacts the gasket and the gasket and the first insulating layer include materials that are the same.

The first electrode layer may include a first active material unit, the first active material unit including a first metal current collector coated with a first active material, and a first non-coated portion on which the first active material is not coated and to which a first electrode tab is attached, and the second electrode layer includes a second active material unit, the second active material unit including a second metal current collector coated with a second active material, and a second non-coated portion on which the second active material is not coated and to which a second electrode tab is attached.

The first electrode tab and the second electrode tab may protrude to the outside between the gasket and the first sealing sheet or between the gasket and the second sealing sheet.

The gasket may include a first lead electrode and a second lead electrode passing through one side of the gasket, wherein the first lead electrode is attached to the first electrode tab and the second lead electrode is attached to the second electrode tab in an internal space of the gasket.

The electrode assembly may further include a fixing member fixing one end portion of each of the first electrode layer, the separator, and the second electrode layer together.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
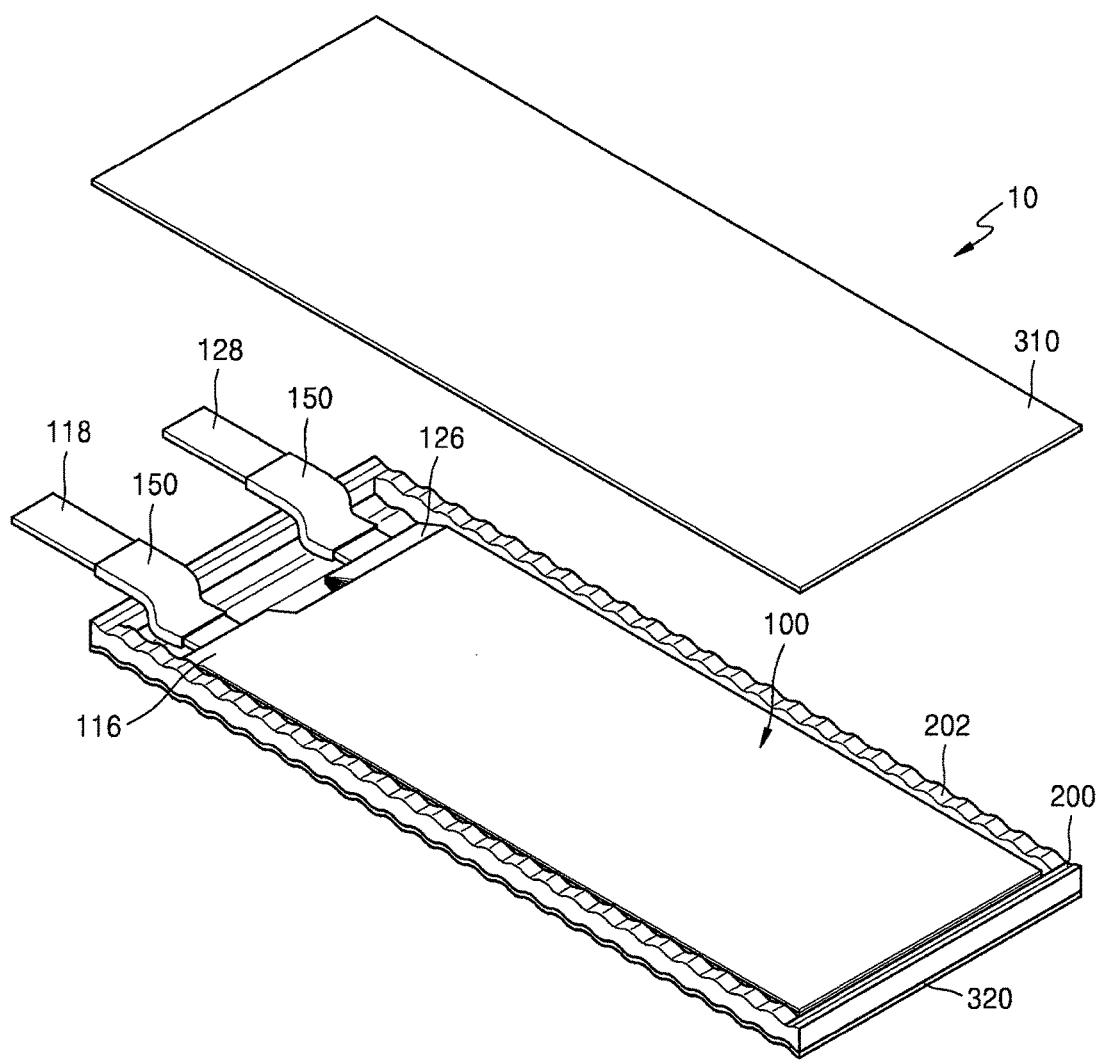
FIG. 1 is an exploded perspective view illustrating a flexible secondary battery according to an embodiment of the present invention.

The present invention may include various embodiments and modifications, and exemplary embodiments thereof are illustrated in the drawings and are described herein in detail. The effects and features of the present invention and the accompanying methods thereof should be apparent from the following description of the embodiments, taken in conjunction with the accompanying drawings. However, the present invention is not limited to the embodiments described herein, and may be embodied in various modes (or many different forms).

Reference will now be made to embodiments of the flexible battery, examples of which are illustrated in the accompanying drawings. In the drawings, the same elements are denoted by the same reference numerals, and an explanation thereof will not be repeated herein.

It will be understood that although the terms "first", "second", etc. may be used herein to describe various elements, these elements should not be limited by these terms. These terms are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of the stated features or components, but do not preclude the presence or addition of one or more additional features or components.

It will be understood that when an element is referred to as being "on" or "formed on," another element, it can be directly or indirectly on or formed on the other element. For example, intervening elements also may be present. Further, when an element is referred to as being "coupled to" or "connected to" another element, it can be directly coupled to or connected to the other element or indirectly coupled to or connected to the other element with one or more intervening elements interposed therebetween.

Sizes of elements may be exaggerated for convenience of explanation. In other words, since sizes and thicknesses of elements in the drawings may be arbitrarily illustrated for convenience of explanation, the following embodiments are not limited thereto.

As used herein, the term "and/or" includes any and all combinations of one or more of the associated listed items. Expressions such as "at least one of," when preceding a list of elements, modify the entire list of elements and do not modify the individual elements of the list.

Figure 2:
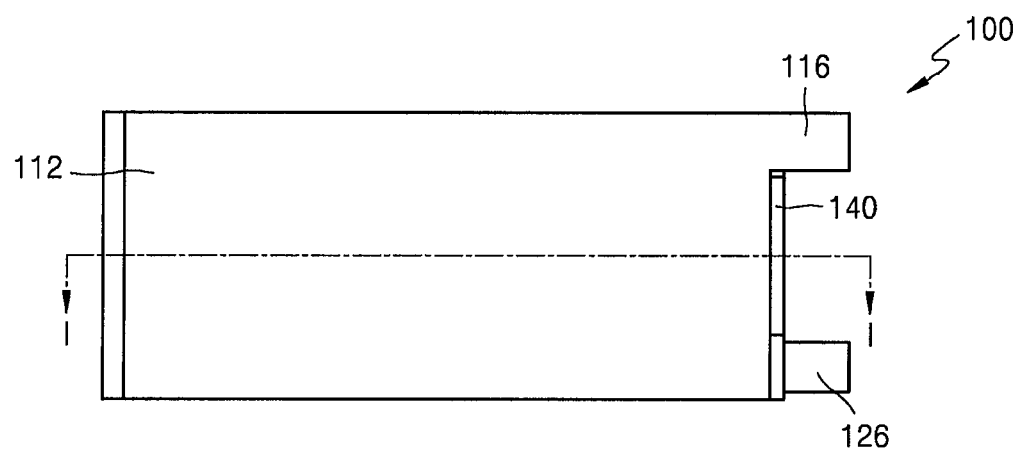
FIG. 2 is a plan view illustrating an electrode assembly of the flexible secondary battery of FIG. 1.
Figure 3:
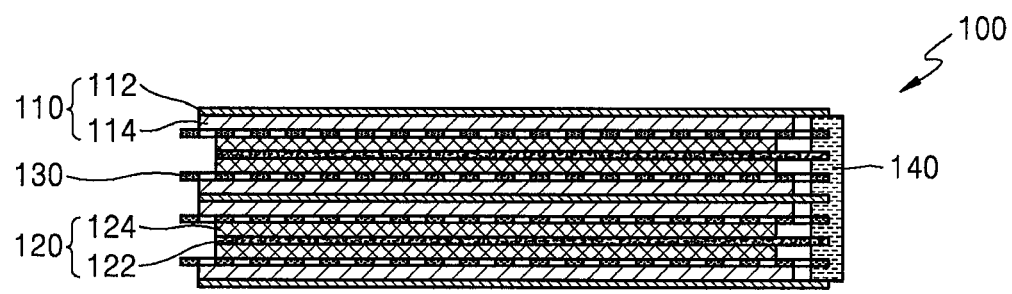
FIG. 3 is a cross-sectional view taken along line I-I' of FIG. 2.
Figure 4:
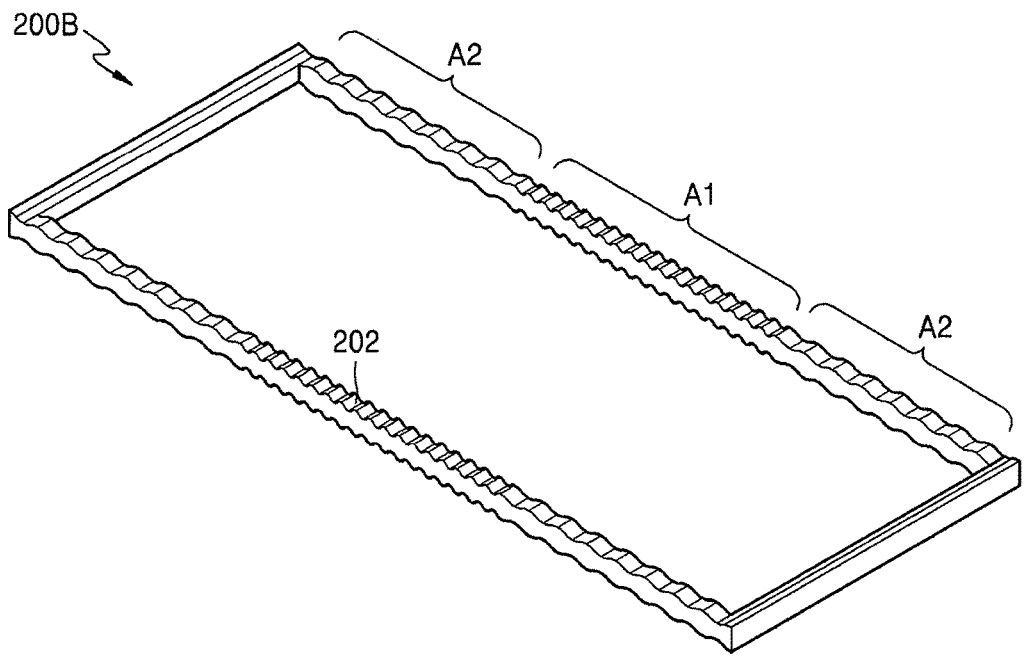
FIG. 4 is a perspective view illustrating an embodiment of a gasket that is a different from a gasket of the flexible secondary battery of FIG. 1.
Figure 5:
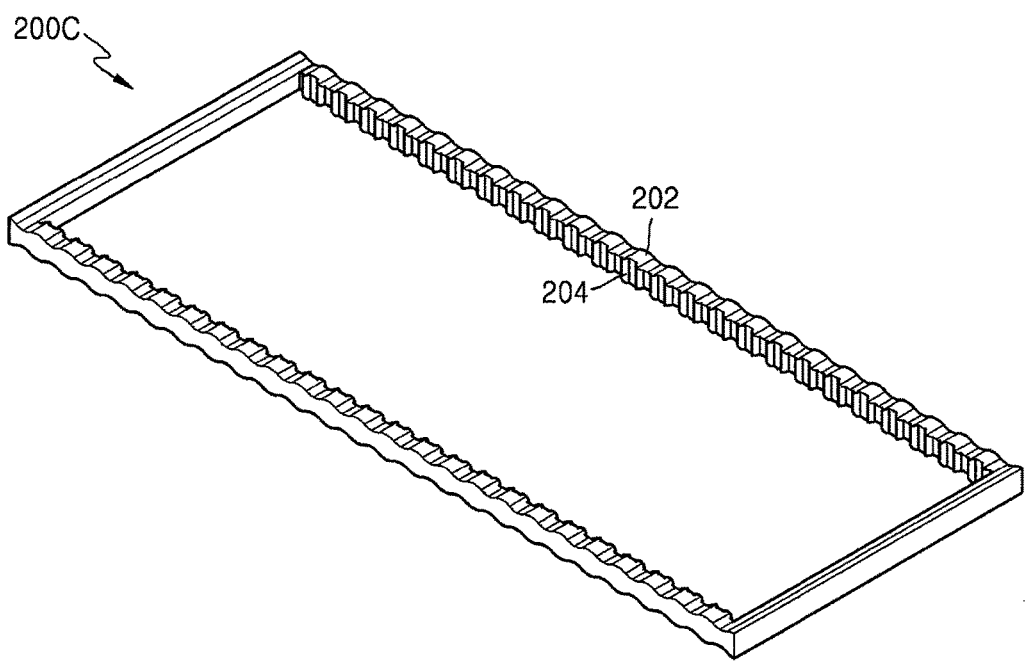
FIG. 5 is a perspective view illustrating another embodiment of a gasket that is different from the gasket of the flexible secondary battery of FIG. 1.
Figure 6:
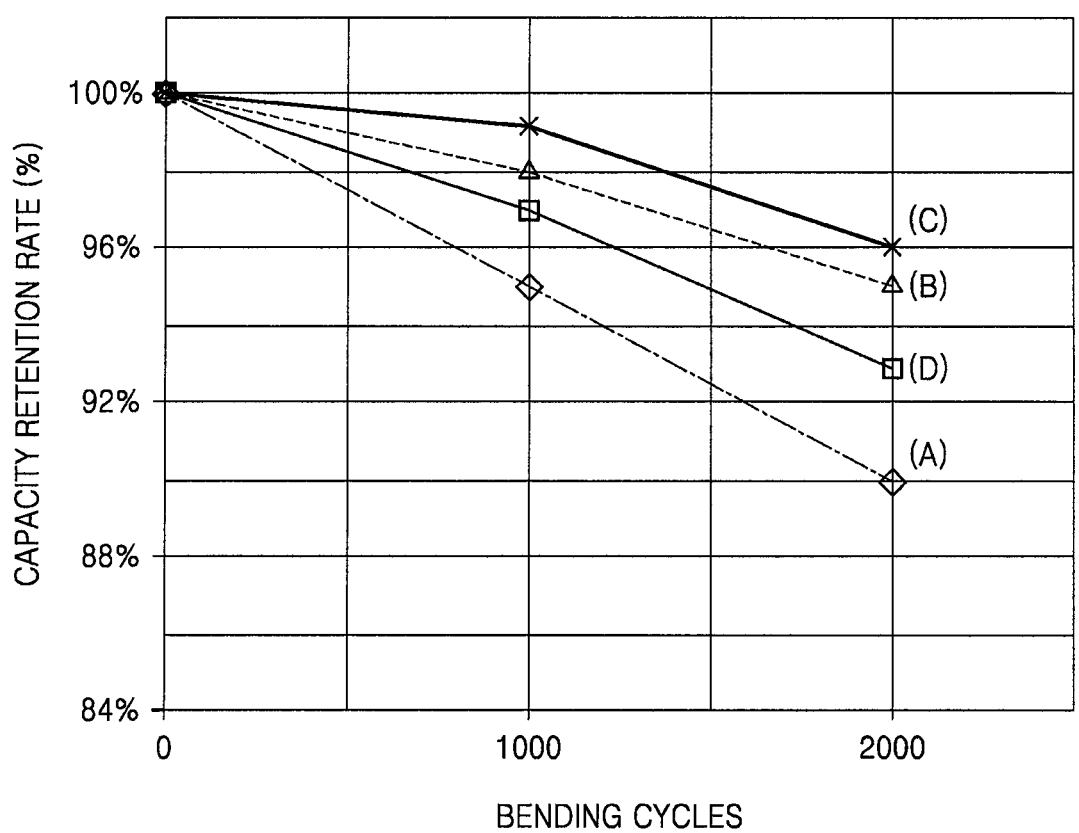
FIG. 6 is a graph illustrating a capacity retention rate after repeated bending cycles of the flexible secondary battery of FIG. 1.

FIG. 1 is an exploded perspective view illustrating a flexible secondary battery 10 according to an embodiment of the present invention. FIG. 2 is a plan view illustrating an electrode assembly 100 of the flexible secondary battery 10 of FIG. 1. FIG. 3 is a cross-sectional view taken along the line I-I' of FIG. 2. FIG. 4 is a perspective view illustrating a gasket 200B that is a modification of a gasket 200 of the flexible secondary battery 10 of FIG. 1 (e.g., the gasket 200B is different from the gasket 200). FIG. 5 is a perspective view illustrating a gasket 200C that is another modification of the gasket 200 of the flexible secondary battery 10 of FIG. 1 (e.g., the gasket 200C is different from the gaskets 200 and 200B). FIG. 6 is a graph illustrating a capacity retention rate of the flexible secondary battery 10 of FIG. 1 after repeated bending cycles.

Referring to FIGS. 1 through 3, the flexible secondary battery 10 may include the electrode assembly 100, the gasket 200 that surrounds edges of the electrode assembly 100, a first sealing sheet 310 that is attached to a first surface of the gasket 200, and a second sealing sheet 320 that is attached to a second surface of the gasket 200 that is opposite to the first surface (e.g., the second surface faces away from the first surface).

The electrode assembly 100 may include a first electrode layer 110, a second electrode layer 120, and a separator 130 between the first electrode layer 110 and the second electrode layer 120. For example, the electrode assembly 100 may have a structure in which a plurality of the first electrode layers 110, a plurality of the separators 130, and a plurality of the second electrode layers 120 are repeatedly stacked (e.g., to form a repeating structure including a repeating unit including the first electrode layer 110, the separator 130, and the second electrode layer 120 stacked in that order).

The first electrode layer 110 may be any one of a positive film and a negative film. When the first electrode layer 110 is a positive film, the second electrode layer 120 may be a negative film. On the other hand, when the first electrode layer 110 is a negative film, the second electrode layer 120 may be a positive film.

The first electrode layer 110 may include a first metal current collector 112, a first active material unit 114 including (e.g., that is formed by coating a surface of the first metal current collector 112 with) a first active material, and a first non-coated portion 116 on which the first active material is not coated. Similarly, the second electrode layer 120 may include a second metal current collector 122, a second active material unit 124 including (e.g., that is formed by coating a surface of the second metal current collector 122 with) a second active material, and a second non-coated portion 126 on which the second active material is not coated.

When the first electrode layer 110 is a positive film, the first metal current collector 112 may be a positive current collector and the first active material unit 114 may be a positive active material unit. When the second electrode layer 120 is a negative film, the second metal current collector 122 may be a negative current collector and the second active material unit 124 may be a negative active material unit.

The positive current collector (e.g., the first metal current collector 112 or the second metal current collector 122) may include (or be formed of) aluminum, stainless steel, titanium, silver, or a combination thereof. The positive active material unit (e.g., the first active material unit 114 or the second active material unit 124) may include a positive active material, a binder, and a conductive material.

The positive active material may include (or be) a material that may reversibly occlude and release lithium ions. For example, the positive active material may include at least one selected from the group consisting of a lithium transition metal oxide (e.g., lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate), nickel sulfide, copper sulfide, sulfur, iron oxide, and vanadium oxide.

The binder may include at least one selected from the group consisting of a polyvinylidene fluoride-based binder (e.g., polyvinylidene fluoride, vinylidene fluoride/hexafluoropropylene copolymer, or vinylidene fluoride/tetrafluoroethylene copolymer), a carboxymethyl cellulose-based binder (e.g., sodium-carboxymethyl cellulose or lithium-carboxymethyl cellulose), an acrylate-based binder (e.g., polyacrylic acid, lithium-polyacrylic acid, acryl, polyacrylonitrile, polymethyl methacrylate, or polybutyl acrylate), polyamideimide, polytetrafluoroethylene, polyethylene oxide, polypyrrole, lithium-nafion, and a styrene butadiene rubber-based polymer.

The conductive material may include at least one selected from the group consisting of a carbon-based conductive material (e.g., carbon black, carbon fiber, or graphite), a conductive fiber (e.g., a metal fiber, metal powder such as carbon fluoride powder, aluminum powder, or nickel powder), a conductive whisker (e.g., zinc oxide or potassium titanate), a conductive metal oxide (e.g., titanium oxide), and a conductive polymer (e.g., a polyphenylene derivative).

The negative current collector may include at least one metal selected from the group consisting of copper, stainless steel, nickel, and titanium. The negative active material unit may include a negative active material, a binder, and a conductive material.

The negative active material may include a material that may form (or become) an alloy with lithium, or may reversibly occlude or release lithium. For example, the negative active material may include at least one selected from the group consisting of a metal, a carbon-based material, a metal oxide, and a lithium metal nitride.

The metal may include at least one selected from the group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

The carbon-based material may include at least one selected from the group consisting of graphite, graphite carbon fiber, coke, mesocarbon microbeads (MCMB), polyacene, pitch-based carbon fiber, and hard carbon.

The metal oxide may include at least one selected from the group consisting of lithium titanium oxide, titanium oxide, molybdenum oxide, niobium oxide, iron oxide, tungsten oxide, tin oxide, amorphous tin mixed oxide, silicon monoxide, cobalt oxide, and nickel oxide.

The binder and the conductive material of the negative active material unit may be the same as those described with respect to the positive active material unit, but the binder and the conductive material of the negative active material unit may be selected independently of the binder and the conductive material of the positive active material unit.

The separator 130 may be formed by, but is not limited to, coating at least one material selected from the group consisting of polyethylene (PE), polystyrene (PS), polypropylene (PP), and a co-polymer of PE and PP with polyvinylidene fluoride cohexafluoropropylene (PVDF-HFP) co-polymer.

A first electrode tab 118 and a second electrode tab 128 are attached to the electrode assembly 110. For example, the first electrode tab 118 and the second electrode tab 128 may be respectively attached by using welding or the like to a plurality of the first non-coated portions 116 and a plurality of the second non-coated portions 126 that are stacked.

The electrode assembly 100 may further include a fixing member 140 that fixes one end portion of each of the first electrode layer 110, the separator 130, and the second electrode layer 120 together. The fixing member 140 between the first non-coated portion 116 and the separator 130 and between the separator 130 and the second non-coated portion 126 may be, but is not limited to, an adhesive or a tape to which an adhesive is applied.

The fixing member 140 does not fix a portion of the first electrode layer 110, the separator 130, or the second electrode layer 120 other than the one end portion of each of the first electrode layer 110, the separator 130, and the second electrode 120 (e.g., fixing member 140 fixes only the one end portion of each of the first electrode layer 110, the separator 130, and the second electrode layer 120). Accordingly, in an area where the fixing member 140 is not formed, the electrode assembly 100 may bend due to slippage between the first electrode 110, the separator 130, and the second electrode layer 120, and relative positions of the first electrode layer 110, the separator 130, and the second electrode layer 120 may be maintained by the fixing member 140 even when the electrode assembly 100 is repeatedly bent.

The fixing member 140 may be at (or on or formed on) the same side of the electrode assembly 100 as the first electrode tab 118 and the second electrode tab 128 in a longitudinal direction of the electrode assembly 100.

Another end portion of each of the first electrode 110, the separator 130, and the second electrode layer 120 at (or on) which the fixing member 140 is not formed undergoes a greater displacement than the one end portion of each of the first electrode layer 110, the separator 130, and the second electrode layer 120 at (or on) which the fixing member 140 is located (or formed) when the electrode assembly 100 is bent. Since the first electrode tab 118 may be attached to (e.g., adhered to) the plurality of first non-coated portions 116 and the second electrode tab 128 may be attached to (e.g., adhered to) the plurality of second non-coated portions 126, the first electrode tab 118 and the second electrode tab 128 may be actually respectively used as fixing units for fixing the first electrode layers 110 and the second electrode layers 120.

Accordingly, when the fixing member 140 is at (or on or formed on) a side of the electrode assembly 110 opposite to the first electrode tab 118 (e.g., a side facing away from the first electrode tab 118) and opposite to the second electrode tab 128 (e.g., facing away from the second electrode tab 128) in the longitudinal direction of the electrode assembly 100, and when the electrode assembly 100 is bent, the first electrode layer 110 and/or the second electrode layer 120 may bend between the first and second electrode tabs 118 and 128 and the fixing member 140 and a part of the fixing member 140 may be destroyed, thereby making it difficult to maintain alignment between the first electrode layer 110, the separator 130, and the second electrode layer 120.

A protective layer may be at (or on or formed on) an outermost surface of the electrode assembly 100. The protective layer may prevent the first electrode layer 110, the separator 130, or the second electrode layer 120 from wrinkling (or reduce a likelihood or amount of such wrinkling) when the electrode assembly 100 is bent. For example, when the electrode assembly 100 is bent, the first electrode layer 110, the separator 130, and the second electrode layer 120 tend to wrinkle in order to reduce a compressive stress. When the first electrode layer 110, the separator 130, or the second electrode layer 120 would otherwise undergo a deformation having a small radius of curvature, such as a wrinkle, the protective layer may prevent (or reduce) a greater deformation by pressing down the first electrode layer 110, the separator 130, or the second electrode 120, and thus, may reduce a stress applied to the first electrode 110, the separator 130, or the second electrode layer 120.

As such, in order for the protective layer to prevent the first electrode layer 110, the separator 130, or the second electrode layer 120 from wrinkling (or to reduce the likelihood or amount of such wrinkling), a bending stiffness of the protective layer may be greater than an average bending stiffness of the first electrode layer 110, the separator 130, and the second electrode layer 120 (e.g., the average of the respective bending stiffness of the first electrode layer 110, the separator 130, and the second electrode 120). For example, a bending stiffness of the protective layer may be about 1.5 times greater than the average bending stiffness of the first electrode layer 110, the separator 130, and the second electrode layer 120 (e.g., the average of the respective bending stiffness of the first electrode layer 110, the separator 130, and the second electrode 120).

Also, the protective layer may include (or be formed of) a material that has not only a set (e.g., predetermined) stiffness but also a set (e.g., predetermined) flexibility in order not to affect (e.g., negatively affect) the bending of the electrode assembly 100 (e.g., so that the flexibility of the electrode assembly is not unduly diminished). For example, the protective layer may include (or be formed as), but is not limited to, a polymer film, a film including a laminated polymer film layer, a metal foil, or a composite film including carbon. For example, the protective layer may have a thickness of about 15 micrometers to about 1 millimeter, and a tensile modulus of elasticity of the protective layer may be about 0.5 GPa to about 300 GPa.

The gasket 200 may surround the edges of the electrode assembly 100, may have an internal space having a central portion that is open and at (or in) which the electrode assembly 100 may be located, and may include (or be formed of) a flexible material. Accordingly, the gasket 200 may bend together with the electrode assembly 100 when the electrode assembly 100 bends, and thus may uniformly or substantially uniformly distribute a stress that is generated when the flexible secondary battery 10 is bent, thereby preventing (or reducing) damage to the electrode assembly 100 due to concentration of the stress.

The first sealing sheet 310 may be attached to the first surface of the gasket 200 and the second sealing sheet 320 may be attached to the second surface of the gasket 200 opposite the first surface (e.g., facing away from the first surface). The first sealing sheet 310 and the second sealing sheet 320, together with the gasket 200, may seal the electrode assembly 100.

Each of the first sealing sheet 310 and the second sealing sheet 320 may include a first insulating layer, a metal layer, and a second insulating layer that are sequentially stacked. Each of the first insulating layer and the second insulating layer may include (or be formed of), but is not limited to, PP, polyethyleneterephthalate (PET), or nylon, and the metal layer may include (or be formed of), but is not limited to, aluminum, steel, or stainless steel.

For example, each of the first sealing sheet 310 and the second sealing sheet 320 may have a three-layer structure including the first insulating layer including (or formed of) PP, the metal layer including (or formed of) aluminum, and the second insulating layer including (or formed of) PET, wherein the first insulating layer of each of the first sealing sheet 310 and the second sealing sheet 320 contacts (e.g., directly or physically contacts) the gasket 200.

The first insulating layer may be attached to the gasket 200 by using thermal bonding. For example, in order to improve a thermal bonding efficiency and increase a bonding force between the first insulating layer and the gasket 200, the gasket 200 may be formed such that a difference between a melting point of a material of the gasket 200 and a melting point of a material of the first insulating layer is equal to or less than 50° C. For example, the gasket 200 may include (or be formed of) the same or substantially the same material as that of the first insulating layer.

The gasket 200 may include an uneven pattern 202 (e.g., an undulating pattern having periodic oscillations) that is at (or on or formed on) at least an area (hereinafter, referred to as a bendable area) of the gasket 200 that may be bent when the flexible secondary battery 10 is bent. The uneven pattern 202 may be formed such that ridges and furrows are continuously and repeatedly (e.g., alternately) arranged in a longitudinal direction of the electrode assembly 100 (e.g., along a length direction of the electrode assembly 100). For example, the uneven pattern 202 may have, but is not limited to, a wave shape.

The uneven pattern 202 may be at (or on or formed on) at least one selected from the first surface of the gasket 200 to which the first sealing sheet 310 is attached, the second surface of the gasket 200 to which the second sealing sheet 320 is attached, and one pair of side surfaces that couple (or connect) the first surface and the second surface. Accordingly, at least one selected from a thickness and a width of the gasket 200 in a portion where the uneven pattern 202 is located (or formed) may vary (or oscillate) according to (e.g., along) the longitudinal direction of the electrode assembly 100.

For example, FIG. 1 illustrates that the uneven pattern 202 is regularly located at (or on or formed on) the first surface and the second surface of the gasket 200. Accordingly, a thickness of the gasket 200 may continuously vary (or oscillate) according to (e.g., along) the longitudinal direction of the electrode assembly 100, the flexible secondary battery 10 may be easily bent, and a stress that is generated when the flexible secondary battery 10 is bent may be uniformly or substantially uniformly distributed. Also, the first sealing sheet 310 and the second sealing sheet 320 may be easily deformed when the flexible secondary battery 10 is bent, thereby improving the reliability of the flexible secondary battery 10.

FIG. 4 is a perspective view illustrating the gasket 200B that is a modification of the gasket 200 of FIG. 1 (e.g., gasket 200B is another embodiment of the gasket). In the gasket 200B of FIG. 4, the uneven pattern 202 has (or is formed to have) partially different pitches (e.g., a first portion having a pitch that is different from that of a second portion). For example, the uneven pattern 202 that is at (or on or formed on) a central portion A1 in the bendable area of the gasket 200B may be denser than the uneven pattern 202 that is at (or on or formed on) an outer portion A2 (e.g., the central portion A1 may include a larger number of undulations than either or both of the outer portions A2). Since the uneven pattern 202 is denser at (or in) the central portion A1 where the gasket 200B undergoes greater deformation than at (or in) the outer portion A2, a stress may be effectively prevented from concentrating on the central portion A1 (or a likelihood or amount of a concentration of such stress may be reduced).

Also, FIG. 5 is a perspective view illustrating the gasket 200C that is another modification of the gasket 200 of FIG. 1 (e.g., gasket 200C is another embodiment of the gasket). The gasket 200C of FIG. 5 includes the uneven pattern 202 (hereinafter, referred to as a first uneven pattern) that is at (or on or formed on) the first surface and the second surface and a second uneven pattern 204 that is at (or on or formed on) an inner side surface from among the one pair of side surfaces that couple (or connect) the first surface and the second surface. For example, the gasket 200C of FIG. 5 further includes the second uneven pattern 204 when compared to the gasket 200 of FIG. 1, and both a thickness and a width of the gasket 200C may vary (or oscillate) along (or in) the longitudinal direction of the electrode assembly 100. As such, when the second uneven pattern 204 is further provided, the gasket 200C may be more easily deformed, thereby more effectively distributing a stress that is generated when the flexible secondary battery 10 is bent.

The gasket 200C may include only the second uneven pattern 204. For example, the first surface and the second surface of the gasket 200C may be flat, and thus a bonding force and a sealing force between the gasket 200C and the first and second sealing sheets 310 and 320 may be increased. Also, like gasket 200B in FIG. 4, the gasket 200C may be formed such that the first uneven pattern 202 and/or the second uneven pattern 204 are denser in a portion where the gasket 200C of FIG. 5 undergoes greater deformation (e.g., a portion of the first uneven pattern 202 and/or a portion of the second uneven pattern 204 may include a larger number of undulations than another portion of the first uneven pattern 202 and/or the second uneven pattern 204, respectively).

Referring back to FIG. 1, the gasket 200 may be formed to have a thickness of about 80% to about 120% of a thickness of the electrode assembly 100, thereby preventing a bent portion from being formed at (or in) the first sealing sheet 310 and the second sealing sheet 320 (or thereby reducing a likelihood of formation of the bent portion). When a thickness of the gasket 200 varies along (or according to) the longitudinal direction of the electrode assembly 100, the thickness of the gasket 200 refers to an average thickness (e.g., an average thickness that takes into account the undulations of the uneven portion).

If the bent portion is formed at (or in) the first sealing sheet 310 and the second sealing sheet 320, a stress may concentrate at (or on) the bent portion that is formed at (or in) the first sealing sheet 310 and the second sealing sheet 320 when the flexible secondary battery 10 is bent, thereby resulting in damage (e.g., tear) to the first sealing sheet 310 and the second sealing sheet 320.

However, according to the present embodiment, since the gasket 200 has (or is formed to have) a thickness of about 80% to about 120% of that of the electrode assembly 100, the bent portion may be prevented from being formed at (or in) the first sealing sheet 310 and the second sealing sheet 320 (or a likelihood or amount of formation of the bent portion may be reduced) when the flexible secondary battery 10 is bent and a stress may be uniformly or substantially uniformly distributed (e.g., the stress is not concentrated at (or on) a specific portion or location of the first sealing sheet 310 and the second sealing sheet 320), thereby improving the stability of the flexible secondary battery 10.

A method of manufacturing the flexible secondary battery 10 will now be explained.

First, the second sealing sheet 320 is attached to the second surface of the gasket 200. The second sealing sheet 320 may be attached to the second surface of the gasket 200 such that the first insulating layer faces the gasket 200 and then the gasket 200 and the first insulating layer are thermally bonded to each other.

Next, the electrode assembly 100 is placed (or disposed) at (or in) the internal space of the gasket 200, and then the first sealing sheet 310 is attached to the first surface of the gasket 200. A method of attaching the first sealing sheet 310 is the same or substantially the same as a method of attaching the second sealing sheet 320. According to some embodiments, the order of attaching the second sealing sheet 320 and the first sealing sheet 310 may be switched (or reversed).

The first electrode tab 118 and the second electrode tab 128 of the electrode assembly 100 may be pulled (or protruded) to the outside between (or through between) the gasket 200 and the first sealing sheet 310, and, in order to increase a bonding force between the gasket 200 and the second sealing sheet 310 and to prevent a shortcircuit between the first electrode tab 118 and the second electrode tab 128 (or to reduce a likelihood of such shortcircuit), insulating films 150 may be attached to respective outer surfaces of the first electrode tab 118 and the second electrode tab 128 that overlap with the gasket 200.

Although the second sealing sheet 320 is described above as being first attached to the gasket 200 and then the first sealing sheet 310 is attached, the present embodiment is not limited thereto and the first sealing sheet 310 may be first attached, or the electrode assembly 100 may be placed (or disposed) at (or in) the gasket 200 and then the first sealing sheet 310 and the second sealing sheet 320 may be concurrently (e.g., simultaneously) or sequentially attached to the gasket 200.

As such, since a space is secured in the flexible secondary battery 10 of the present embodiment in which the electrode assembly 100 is received by using the gasket 200, a drawing work for forming a space in a pouch in which the electrode assembly 100 is received may be omitted.

Also, in other batteries, as a thickness of the electrode assembly 100 increases, a drawing work depth increases to correspond to the thickness of the electrode assembly 100, thereby increasing a risk of a crack forming in the pouch. However, according to the flexible secondary battery 10 of embodiments of the present invention, since a thickness of the gasket 200 is freely determined according to a thickness of the electrode assembly 100, the flexible secondary battery 10 having a large capacity may be easily manufactured.

In addition, since the gasket 200 includes (or is formed of) a flexible material, bends together with the electrode assembly 100, and includes the uneven pattern 202 that is at (or on or formed on) the bendable area of the gasket 200, a stress that is generated when the flexible secondary battery 10 is bent may be uniformly or substantially uniformly distributed, thereby maintaining the stability and reliability of the flexible secondary battery 10 even when the flexible secondary battery 10 is repeatedly bent.

Table 1 shows results obtained after secondary batteries of Comparative Example 1 and Comparative Example 2 were repeatedly bent 1000 times and 2000 times, respectively to each have a curvature radius of 25 mm and then capacity retention rates of the secondary batteries of Comparative Example 1 and Comparative Example 2 are compared with each other. Comparative Example 1 corresponds to a secondary battery where a receiving portion in which the secondary battery is received is formed in a pouch by using a drawing work and then the pouch outside the receiving portion is sealed by using thermal bonding. Comparative Example 2 corresponds to a secondary battery including a gasket similar to the gasket 200 of the flexible secondary battery 10 of FIG. 1, except that the gasket of Comparative Example 2 does not include an uneven pattern.

TABLE 1

|  | Bending Cycles | | |
| --- | --- | --- | --- |
|  | 0 | 1000 | 2000 |
| Comparative Example 1 | 100% | 75.4% | 23.6% |
| Comparative Example 2 | 100% | 95.6% | 90.3% |

As shown in Table 1, in Comparative Example 1, a capacity retention rate after 1000 bending cycles is reduced to 75.4% and is further greatly reduced to 23.6% after 2000 bending cycles. In contrast, in Comparative Example 2, a capacity retention rate is equal to or greater than 90% even after 2000 bending cycles. This is because the gasket 200 bends together with the flexible secondary battery 10 when the flexible secondary battery 10 is bent and thus a stress may be uniformly or substantially uniformly distributed, thereby preventing damage to the electrode assembly 100 (or reducing a likelihood or amount of such damage).

FIG. 6 is a graph illustrating results obtained after flexible secondary batteries were repeatedly bent 1000 times and 2000 times to each have a curvature radius of 25 mm and then capacity retention rates of the flexible secondary batteries were compared with one another. In FIG. 6, case A corresponds to the same secondary battery as Comparative Example 2 of Table 1, and cases B, C, and D correspond to embodiments of the present invention.

In detail, case A corresponds to a secondary battery where the gasket is similar to the gasket 200 in the flexible secondary battery 10 of FIG. 1, except that the gasket of case A does not include an uneven pattern, like in Comparative Example 2 of Table 1.

In contrast, case B corresponds to a flexible secondary battery where the gasket 200 in the flexible secondary battery 10 of FIG. 1 includes the uneven pattern 202 that is at (or on or formed on) the first surface and the second surface. Case C corresponds to a flexible secondary battery where the flexible secondary battery 10 includes the gasket 200C of FIG. 5. Also, case D corresponds to a flexible secondary battery where the flexible secondary battery 10 includes the gasket 200C including only the second uneven pattern 204 of FIG. 5.

As shown in FIG. 6, cases B, C, and D each have a lower capacity reduction rate than case A. For example, when the gasket 200 is formed such that at least one selected from a thickness and a width varies (or oscillates) along (or according to) the longitudinal direction of the electrode assembly 100, a stress that is generated when the flexible secondary battery 10 repeatedly bends may be more uniformly or substantially uniformly distributed, thereby further improving the reliability of the flexible secondary battery 10.

Figure 7:
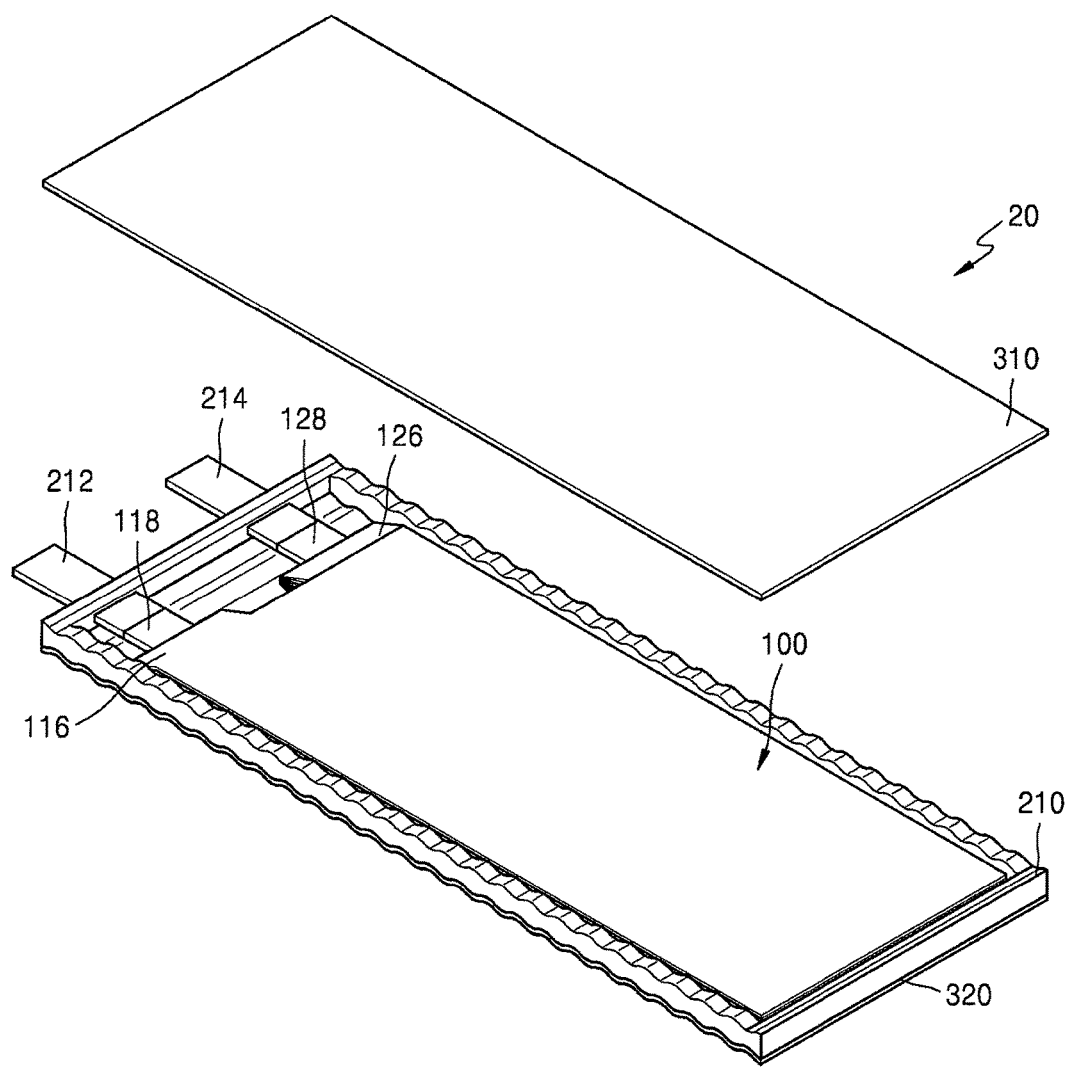
FIG. 7 is an exploded perspective view illustrating another embodiment of a flexible secondary battery that is different from the flexible secondary battery of FIG. 1.
Figure 8:
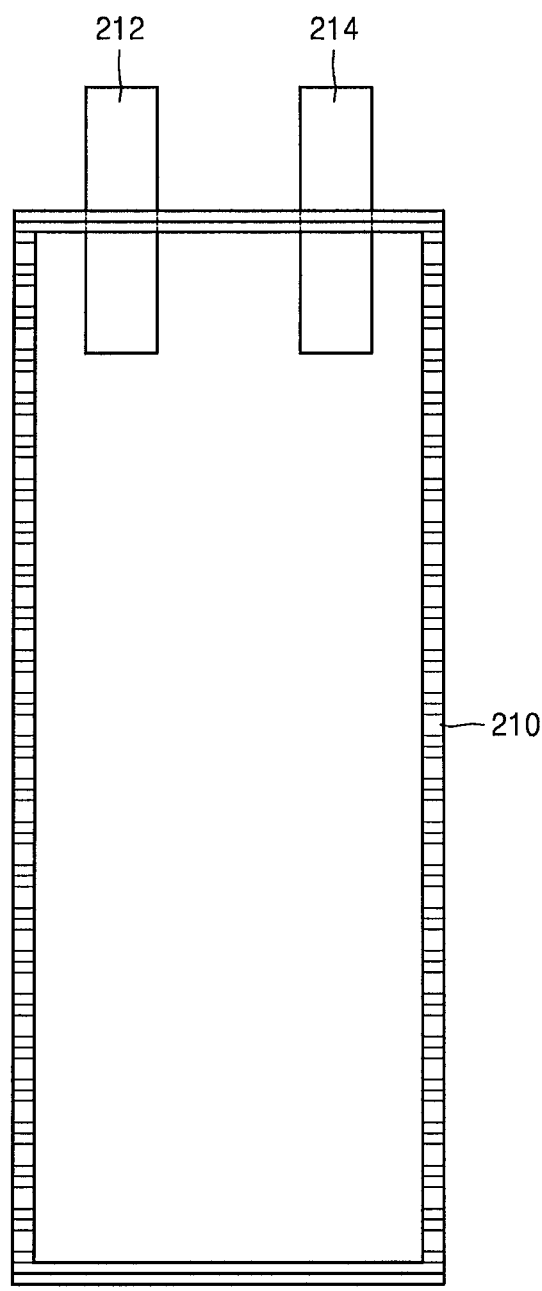
FIG. 8 is a plan view illustrating a gasket of the flexible secondary battery of FIG. 7.

FIG. 7 is an exploded perspective view illustrating a flexible secondary battery 20 that is a modification of the flexible secondary battery 10 of FIG. 1 (e.g., another embodiment of the flexible secondary battery). FIG. 8 is a plan view illustrating a gasket 210 of the flexible secondary battery 20 of FIG. 7.

Referring to FIGS. 7 and 8, the flexible secondary battery 20 may include the electrode assembly 100, the gasket 210 that surrounds an edge of the electrode assembly 100, the first sealing sheet 310 that is attached to a first surface of the gasket 210, and the second sealing sheet 320 that is attached to a second surface of the gasket 210 that is opposite to the first surface (e.g., faces away from the first surface).

The electrode assembly 100, the first sealing sheet 310, and the second sealing sheet 320 are the same as those of FIGS. 1 through 3, and thus the explanation thereof will not be repeated here.

The gasket 210 may surround the edge of the electrode assembly 100 and may include (or be formed of) a flexible material. Accordingly, the gasket 210 bends together with the electrode assembly 100 when the flexible secondary battery 20 is bent, and thus may uniformly or substantially uniformly distribute a stress, thereby effectively preventing damage to the electrode assembly 100 (or reducing a likelihood or amount of such damage).

The gasket 210 may include a first lead electrode 212 and a second lead electrode 214 that pass through one side of the gasket 210. The first lead electrode 212 and the second lead electrode 214 may be integrally formed with the gasket 210 by using insert molding.

The first lead electrode 212 may be attached (e.g., adhered to) the first electrode tab 118 in an internal space of the gasket 210, and the second lead electrode 214 may be attached (e.g., adhered to) the second electrode tab 128 in the internal space of the gasket 210. The first electrode tab 118 may be attached (e.g., adhered to) the first non-coated portion 116 and the second electrode tab 128 may be attached (e.g., adhered to) the second non-coated portion 126.

As such, when the first electrode tab 118 and the second electrode tab 128 are respectively coupled to (or connected to) the first lead electrode 212 and the second lead electrode 214, the first electrode tab 118 and the second electrode tab 128 are coupled to (or connected to) the outside without bending, thereby preventing damage to the first electrode tab 118 and the second electrode tab 128 (or reducing a likelihood or amount of such damage). Also, since the first electrode tab 118 and the second electrode tab 128 are not between the gasket 210 and the first sealing sheet 310 or the second sealing sheet 320, a bonding force between the gasket 210 and the first sealing sheet 310 or the second sealing sheet 320 may be increased.

A method of manufacturing the flexible secondary battery 20 is basically or substantially the same as the method of manufacturing the flexible secondary battery 10 described with reference to FIGS. 1 through 3. However, when the electrode assembly 100 is placed (or disposed) at (or in) the internal space of the gasket 210, the first electrode tab 118 and the second electrode tab 128 may be respectively attached to the first lead electrode 212 and the second lead electrode 214 by using welding or the like.

As described above, according to the one or more of the above embodiments of the present invention, the stability and reliability of a flexible secondary battery may be maintained even after the flexible secondary battery is repeatedly bent.

Other unmentioned effects of embodiments of the present invention will be apparent to one of ordinary skill in the art from the above description.

While the present invention has been particularly shown and described with reference to exemplary embodiments thereof using specific terms, the embodiments and terms have been used to explain the present invention and should not be construed as limiting the scope of the present invention defined by the claims. Accordingly, it will be understood by those of ordinary skill in the art that various changes in form and details may be made therein without departing from the spirit and scope of the present invention as defined by the following claims, and equivalents thereof.

What is claimed is:

1. A flexible secondary battery comprising:
   an electrode assembly comprising a first electrode layer, a second electrode layer, and a separator between the first electrode layer and the second electrode layer;
   a gasket having flexibility and surrounding edges of the electrode assembly;
   a first sealing sheet attached to a first surface of the gasket; and
   a second sealing sheet attached to a second surface of the gasket facing away from the first surface,
   wherein an uneven pattern is at a bendable area of the gasket,
   wherein the uneven pattern comprises a plurality of ridges that extend across at least one selected from a thickness and a width of the gasket, and
   wherein a distance between adjacent ones of the ridges varies along the bendable area of the gasket.

2. The flexible secondary battery of claim 1, wherein the uneven pattern is at at least one selected from the first surface, the second surface, and one pair of side surfaces of the gasket that couple the first surface and the second surface.

3. The flexible secondary battery of claim 1, wherein at least one selected from the thickness and the width of the gasket varies at the bendable area along a longitudinal direction of the electrode assembly.

4. The flexible secondary battery of claim 3, wherein the gasket has an average thickness of about 80% to about 120% of a thickness of the electrode assembly.

5. The flexible secondary battery of claim 1, wherein the uneven pattern is formed to be denser at a central portion of the bendable area than at an outer portion of the bendable area.

6. The flexible secondary battery of claim 1, wherein the uneven pattern has a wave shape.

7. The flexible secondary battery of claim 1, wherein each of the first sealing sheet and the second sealing sheet comprises a first insulating layer, a metal layer, and a second insulating layer,
wherein the first insulating layer contacts the gasket, and the gasket and the first insulating layer comprise materials that are the same.

8. The flexible secondary battery of claim 1, wherein the first electrode layer comprises:
a first active material unit, the first active material unit comprising a first metal current collector coated with a first active material, and
a first non-coated portion on which the first active material is not coated and to which a first electrode tab is attached, and
wherein the second electrode layer comprises:
a second active material unit, the second active material unit comprising a second metal current collector coated with a second active material, and
a second non-coated portion on which the second active material is not coated and to which a second electrode tab is attached.

9. The flexible secondary battery of claim 8, wherein the first electrode tab and the second electrode tab protrude to the outside between the gasket and the first sealing sheet or between the gasket and the second sealing sheet.

10. The flexible secondary battery of claim 8, wherein the gasket comprises a first lead electrode and a second lead electrode passing through one side of the gasket,
wherein the first lead electrode is attached to the first electrode tab and the second lead electrode is attached to the second electrode tab in an internal space of the gasket.

11. The flexible secondary battery of claim 1, wherein the electrode assembly further comprises a fixing member fixing one end portion of each of the first electrode layer, the separator, and the second electrode layer together.

\* \* \* \* \*